Nov. 11, 1958     A. V. L. C. DEBRIE     2,859,919

FRICTION DEVICE FOR FILM SPOOLS

Filed April 25, 1955

INVENTOR
Andre Victor Leon Clement
Debrie
BY
Michael S. Striker
ATTORNEY

2,859,919
FRICTION DEVICE FOR FILM SPOOLS

André Victor Léon Clément Debrie, Paris, France

Application April 25, 1955, Serial No. 503,482

Claims priority, application France June 9, 1954

4 Claims.  (Cl. 242—55.11)

The present invention relates to friction devices for films spools and, more particularly, to an adjustable friction device for supporting pay-off film spools.

In the treatment of cinematographic films, it is often required that the film be reeled off in such manner that the tension of the film which causes the reel to rotate be constantly maintained between fairly narrow limits, whatever the size of the reel and, therefore, its weight which decreases as the film is reeled off.

For reasons of proper operation of the machine, safety devices and so on, it is, furthermore, necessary that the spool comes to rest as soon as the tension ceases, in order to avoid, particularly, the formation of slack which, at the moment of restarting, would create a dangerous overtension likely to break the film.

Heretofore, friction devices of various types have been used which solve the problem more or less satisfactorily and which are generally bulky.

The object of the present invention is to provide a friction device which strictly fills the requirements hereinabove set forth, which is remarkably simple and in which the friction adjustment is achieved by a mere angular setting of the stationary shaft which receives the hub of the spool, with respect to a vertical plane.

According to the main feature of the invention, the device comprises in combination: a horizontal stationary supporting shaft angularly adjustable in a support, and a flexible thin sleeve having an inner diameter somewhat larger than the diameter of said supporting shaft and threaded thereover and secured thereto along a common generatrix of said shaft and sleeve, the outer diameter of said sleeve being somewhat smaller than the diameter of the bore of the spool hub.

Under the action of its own weight, the spool is urged downward and takes a bearing locally upon the deformable sleeve which, itself, is locally bearing upon the shaft.

Since the sleeve is secured to the shaft at least along one generatrix thereof, when the reel rotates by virtue of the tension of the film being unwound, it tends to drive the sleeve which bears in a variable manner, according to the angular distance between the uppermost bearing generatrix of the spool hub upon said sleeve and the generatrix where the sleeve is secured to the cylindrical shaft, a condition which brings in the possibility for the slowing down effort to be adjusted between a maximum value when the spool is full and a minimum value when it is empty.

Other and further objects and advantages of the invention will be apparent to those skilled in the art from a consideration of the following description of one specific embodiment of the invention, shown by way of example, in the accompanying drawings, in which.

Figure 1:
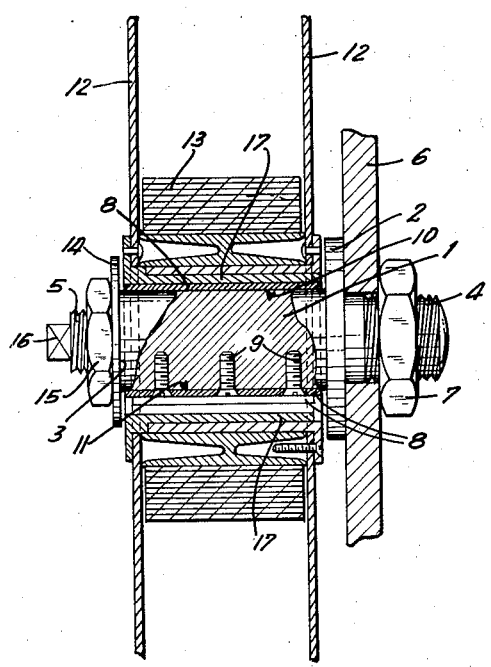
Fig. 1 is an axial section of a friction device for a film spool with a spool mounted on it, embodying the invention.

Referring now particularly to the drawing, 1 is a cylindrical shaft formed with two shoulders 2 and 3 and having opposite threaded end portions 4 and 5.

Said shaft 1 is supported by a wall 6 clamped between the collet 2 of the shaft and a nut 7 threadedly engaged on the end portion 4. The shaft, thus, may be angularly adjusted as desired, on its own axis.

Slipped over the shaft 1 is a cylindrical flexible thin sleeve 8. Said sleeve may be, for instance, made of nylon and have a thickness of 5/10 mm. in the embodiment illustrated it is secured, as by means of screws 9 having their heads countersunk into the nylon sleeve along a generatrix 11 of the shaft 1.

Figure 2:
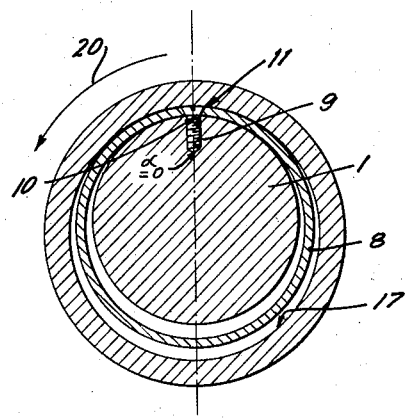
Figs. 2, 3 and 4 are diagrammatical cross-sections for explaining the operation of the device of Fig. 1.
Figure 4:
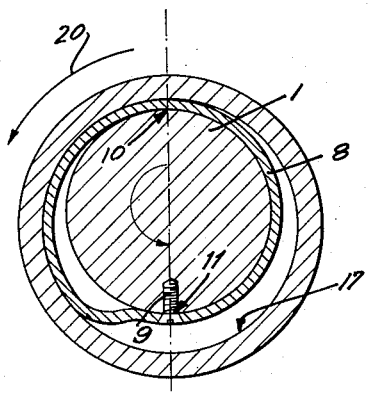
Figure 3:
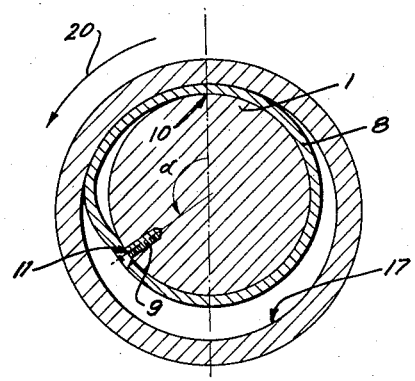

The spool 12 on which the film 13 is wound is mounted over the sleeve 8 and a clearance is provided between the flanges of the spool 12 and the adjacent shoulders 2 and 14 of the shaft. Actually, the shoulder 14 is constituted by a washer pressed against the shoulder 3 of the shaft by a screw nut 15 threadedly engaged on the end portion 5. The end portion 5 of the shaft 1 is terminated into squared portion 16 for facilitating the angular positioning of the shaft 1. It is thus possible to adjust the angle $\alpha$ between the radial plane containing the generatrix 11 along which the sleeve 8 is secured to the shaft 1 and the vertical radial plane containing the uppermost generatrix 10 of the shaft 1. For this purpose, it is sufficient to release the nut 7 and turn the squared portion 16 the required angle. Figs. 2, 3 and 4, in which the differences between the radial dimensions are purposely greatly magnified, show the clearances between the shaft 1 and the sleeve 8 on one hand, and between the latter and the bore in the hub 17 of the spool 12, on the other hand.

Experience has shown that, when the generatrices 11 and 10 are in coincidence (Fig. 2), minimum friction is obtained for the full spool. Said friction depends only on the weight and the coefficient of friction and is proportional to these two numbers.

When the generatrix 11 is set, an angle $\alpha$ with respect to the generatrix 10 (Fig. 3), it is found that the braking effect is stronger than that obtained by the formula $F=P.f$, in which F is the frictional force, P the weight of the spool and $f$ the coefficient of friction.

When $\alpha=180°$ F increases and still increases up to a point located, for instance, between 180° and 360° and then decreases. It seems that this test result may be partly explained by an upholding of the sleeve, which is driven in the direction of the arrow 20 by the hub 17.

This sleeve, which, in the diagram of Fig. 2, is not driven and is not in a frictional engagement with the hub 17 at locations other than the zone 10–11 where it is clamped between 1 and 17, effects a slowing down action which corresponds to the coefficient of friction factor $f$ and the weight P of the spool.

In the position of Fig. 3, the portion of the sleeve extending between 11 and 10 in the direction of the arrow 20 is driven and pulled flat against the shaft 1 and is not in frictional engagement with the spool hub. In the portion between 10 and 11 in the direction of the arrow 20 the sleeve 8, as a contrast, is driven beyond the position of equilibrium shown in Fig. 2; it, then, comes into engagement with the bore 17 and upholds the hub while taking a bearing along the generatrix 11 on the shaft 1 which is stationary; the sleeve 8 expands and presses outwardly against the bore 17 in the same manner as in the braking devices of the "unwinding" type.

This uphold effect is still increased when the conditions prevailing are those shown in the diagram of Fig. 4. The assembly illustrated in Fig. 1 assumes the position shown in Fig. 4.

When the clearances are fairly thin, said upholding action may be accompanied by an increase in the thickness of the sleeve in the portion thereof which is under compression, whereby an increase in the braking effect is obtained.

Anyhow, whatever may be the complexity of the phenomenon, experience has shown that this device, which is very simple and of small dimension, is very efficient.

The thin sleeve may be of any flexible material, such as nylon, other plastics or very thin metal sheet.

In the embodiment hereinabove described, the flexible sleeve is made of a single tubular piece secured to the shaft along a generatrix. Said sleeve, however, could also be made from a flat sheet of material rolled into a tubular piece and having both its edges secured together and to the shaft along said generatrix.

Furthermore, non-homogeneous sleeves may be designed which are constituted by a deformable surface carrying, on each side thereof, elements which become frictional elements when deformation of said surface causes these elements to come into engagement with the pieces to be slowed down.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

What I claim is:

1. An adjustable friction supporting device for pay-off film spools, comprising in combination: a support, a horizontal stationary supporting shaft carried by said support, means for angularly adjusting the shaft about its axis with respect to said support, and a flexible thin sleeve having an inner diameter somewhat larger than the diameter of said supporting shaft and through which said shaft extends, said sleeve being secured to said shaft along a common generatrix of said shaft and sleeve, the outer diameter of said sleeve being somewhat smaller than the diameter of the bore of the spool hub.

2. Device according to claim 1, wherein said flexible thin sleeve is made of sheet material wound into a hollow cylinder and having both its ends secured together and to said supporting shaft along said generatrix.

3. Device according to claim 1, wherein said flexible thin sleeve is secured to said shaft by means of countersunk screws.

4. An adjustable braking arrangement, comprising, in combination, a cylindrical, substantially horizontal shaft; support means supporting said shaft for turning movement about its axis, said shaft having an elongated free portion extending freely from said support means; fixing means engaging said shaft and support means for fixing said shaft in a given angular position about its axis with respect to said support means; and a sleeve of flexible sheet material through which said elongated free portion of said shaft extends with clearance, said sleeve being fixed to the outer surface of said shaft along a line parallel to the axis of said shaft, so that when said sleeve extends with clearance into an elongated cylindrical hub which rests on the uppermost part of said sleeve and when said line is located at a position other than the uppermost part of said shaft, part of the sleeve extending in one direction from said line will be tensioned by the rotating hub and part of said sleeve extending in the opposite direction from said line will be compressed by the rotating hub and pressed against the same for braking the rotation thereof.

References Cited in the file of this patent

UNITED STATES PATENTS

| | | |
|---|---|---|
| 563,903 | Mills | July 14, 1896 |
| 1,158,406 | Pierce et al. | Oct. 26, 1915 |
| 1,651,679 | Dunn | Dec. 6, 1927 |
| 2,476,894 | Mulheim | July 19, 1949 |
| 2,686,018 | Courtney | Aug. 10, 1954 |

FOREIGN PATENTS

| | | |
|---|---|---|
| 822,522 | Germany | Nov. 26, 1951 |